United States Patent
Vargantwar

(10) Patent No.: US 8,542,641 B1
(45) Date of Patent: Sep. 24, 2013

(54) QUICK REASSIGNMENT OF INVALID FORWARD TRAFFIC CHANNELS

(75) Inventor: Sachin R Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 355 days.

(21) Appl. No.: 12/880,368

(22) Filed: Sep. 13, 2010

(51) Int. Cl.
*H04W 4/00* (2009.01)
*H04L 12/28* (2006.01)

(52) U.S. Cl.
USPC ........... 370/329; 370/340; 370/341; 370/431; 370/437

(58) Field of Classification Search
USPC .......................... 370/329, 340, 341, 431, 437
See application file for complete search history.

(56) References Cited

U.S. PATENT DOCUMENTS

| | | | |
|---|---|---|---|
| 2006/0153139 A1* | 7/2006 | Bae et al. | 370/335 |
| 2006/0233150 A1* | 10/2006 | Cherian | 370/342 |
| 2008/0233936 A1* | 9/2008 | Rajan et al. | 455/417 |

* cited by examiner

*Primary Examiner* — Benjamin H Elliott, IV

(57) ABSTRACT

Disclosed herein are methods and systems that may, among other possible benefits, help an access network to more quickly re-assign a forward traffic channel. An exemplary method involves an access network: (i) making a determination that a forward traffic channel is invalid, wherein the forward traffic channel is initially assigned to a first access terminal; and (ii) in response to the determination that the forward traffic channel is invalid: (a) after sending a first configuration message indicating that the forward traffic channel is invalid, waiting for at least a predetermined wait period before sending a second configuration message indicating that the forward traffic channel is valid; and (b) before the predetermined wait period has ended, making the forward traffic channel available for re-assignment to a second access terminal.

21 Claims, 4 Drawing Sheets

QUICK REASSIGNMENT OF INVALID FORWARD TRAFFIC CHANNELS

BACKGROUND

Many people use access terminals, such as cell phones and personal digital assistants (PDAs), to communicate with cellular wireless networks. These access terminals and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Access terminals typically conduct these wireless communications with one or more base transceiver stations (BTSs), each of which send communications to and receive communications from access terminals over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, access terminals can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

Wireless communications between an access terminal and a serving BTS in a given coverage area will typically be carried out in accordance with one or more agreed air interface protocols that define a mechanism for wireless exchange of information between the access terminal and BTS. Examples of such protocols include CDMA (e.g., EIA/TIA/IS-2000 Rel. 0, A (commonly referred to as "IS-2000" or "1xRTT"), EIA/TIA/IS-856 Rel. 0, A, or other version thereof (commonly referred to as "IS-856", "1xEV-DO", or "EVDO")), iDEN, WiMAX (e.g., IEEE 802.16), LTE, TDMA, AMPS, GSM, GPRS, UMTS, or EDGE, and others now known or later developed.

The air interface protocol will generally define a "forward link" encompassing communications from the BTS to access terminals and a "reverse link" encompassing communications from access terminals to the BTS. Further, each of these links may be structured to define particular channels, through use of time division multiplexing, code division multiplexing (e.g., spread-spectrum modulation), frequency division multiplexing, and/or some other mechanism. Accordingly, a number of forward-link traffic channels (also referred to as forward traffic channels) may be provided for communications from the BTS to access terminals in the BTS's coverage area. Similarly, a number of reverse-link traffic channels (also referred to as reverse traffic channels) may be provided to receive communications from the access terminals.

OVERVIEW

In one aspect of providing wireless service, access networks periodically broadcast configuration messages, which provide access terminals with updated system information in their respective coverage areas. For example, under EV-DO, a BTS periodically broadcasts a QuickConfig message that includes current system information for access terminals operating in the BTS's coverage area. Each QuickConfig message typically includes an indication, for each forward traffic channel that is currently assigned to an access terminal, as to whether or not the forward traffic channel is valid or invalid. A forward traffic channel assigned to a given access terminal is typically considered to be invalid when reverse-link connectivity with the access terminal is lost. Thus, the QuickConfig message will typically indicate that a given forward traffic channel is valid, so long as the corresponding reverse traffic channel is functioning properly.

Forward traffic channels are typically considered to be invalid when the corresponding reverse-link connection with an access terminal is lost. In this scenario, it is likely that forward-link communications to the access terminal will also fail. However, when an access terminal does not receive forward-link communications from the access network as expected, it does not immediately conclude that its call has been dropped. Instead, the access terminal starts a drop-call timer, and only considers the call to have been dropped after the drop-call timer expires without receipt of communications from the access network. Since it is likely that an access terminal will not receive forward-link communications when its assigned forward traffic channel becomes invalid, it is likely that it will not receive the QuickConfig message indicating that its assigned forward traffic channel is invalid, and will start its drop-call timer.

In existing access networks, when an access network re-assigns a forward traffic channel, the access network again lists the forward traffic channel as valid in QuickConfig messages. If an access network were to re-assign a forward traffic channel and send a QuickConfig message indicating the forward traffic channel to be valid again, before an access terminal's drop-call timer expired, the access terminal might wrongly assume that forward link communications to another access terminal were intended for it. Accordingly, when a forward traffic channel is determined to be invalid, existing access networks are configured to send a QuickConfig indicating that the forward traffic channel is invalid, and then, for a predetermined wait period (e.g., 5 seconds), to (a) refrain from re-assigning the forward traffic channel and (b) list the forward traffic channel as invalid.

Unfortunately, however, during the required wait period, the forward traffic channel is unavailable to be assigned to other access terminals. This may be undesirable in times of high traffic and/or in other scenarios. Further, this may be particularly undesirable in access networks providing service under a protocol such as EVDO, where there are often many short connections (with access terminals establishing new connections for brief data communication and then ending the connection).

Accordingly, when a forward traffic channel becomes invalid, exemplary embodiments may help to more quickly make the forward traffic channel available for re-assignment. In particular, when an access network determines that a forward traffic channel is invalid, it may continue to indicate that the forward traffic channel is invalid (e.g., by sending QuickConfig messages indicating as such) during the predetermined wait period, thus allowing time for an access terminal to determine that its call has been dropped. However, according to an exemplary embodiment, the access network does not wait before making the forward traffic channel available for re-assignment, and preferably makes the forward traffic channel available for re-assignment immediately upon determining it is invalid. Therefore, during the wait period, the access network may indicate a forward traffic channel is invalid in QuickConfig messages, even after the forward traffic channel has been re-assigned and is valid with respect to the access terminal to which the forward traffic channel has been re-assigned.

Further, to facilitate quick re-assignment of forward traffic channels, access terminals may be provisioned to ignore indications that a forward traffic channel is invalid for a predetermined period of time after first acquiring a connection (i.e., after first being assigned the forward traffic channel). Otherwise, an access terminal to which a forward traffic channel is re-assigned might incorrectly deem its call to have been dropped based on an indication that the forward traffic channel is invalid, when the indication is in fact directed to the access terminal to which the forward traffic channel was previously assigned.

In one aspect, an exemplary method may involve an access network: (i) making a determination that a forward traffic channel is invalid, wherein the forward traffic channel is initially assigned to a first access terminal; and (ii) in response to the determination that the forward traffic channel is invalid, the access network: (a) after sending a first configuration message indicating that the forward traffic channel is invalid, waiting for at least a predetermined wait period before sending a second configuration message indicating that the forward traffic channel is valid; and (b) before the predetermined wait period has ended, making the forward traffic channel available for re-assignment to a second access terminal.

In a further aspect, another exemplary method may involve an access terminal: (i) receiving a channel assignment message from an access network, wherein the channel assignment messages identifies a forward traffic channel that is assigned to the access terminal; and (ii) responsive to receipt of the channel assignment message, the access terminal ignoring validity indications for the assigned forward traffic channel in any QuickConfig messages received during a predetermined ignore period. Further, after the predetermined ignore period has ended, the method may involve the access terminal monitoring validity indications for the assigned forward traffic channel in QuickConfig messages received from the access network.

And in a further aspect, an exemplary access-network component may include a non-transitory tangible computer-readable medium, as well as program instructions stored on the non-transitory tangible computer-readable medium and executable by at least one processor to: (i) determine that a forward traffic channel in a given coverage area of an access network is invalid, wherein the forward traffic channel is initially assigned to a first access terminal; and (ii) in response to the determination that the forward traffic channel is invalid: (a) after sending a first configuration message indicating that the forward traffic channel is invalid, wait for at least a predetermined wait period before sending a second configuration message indicating that the forward traffic channel is valid, and (b) before the predetermined wait period has ended, make the forward traffic channel available for re-assignment to a second access terminal.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

Figure 1:
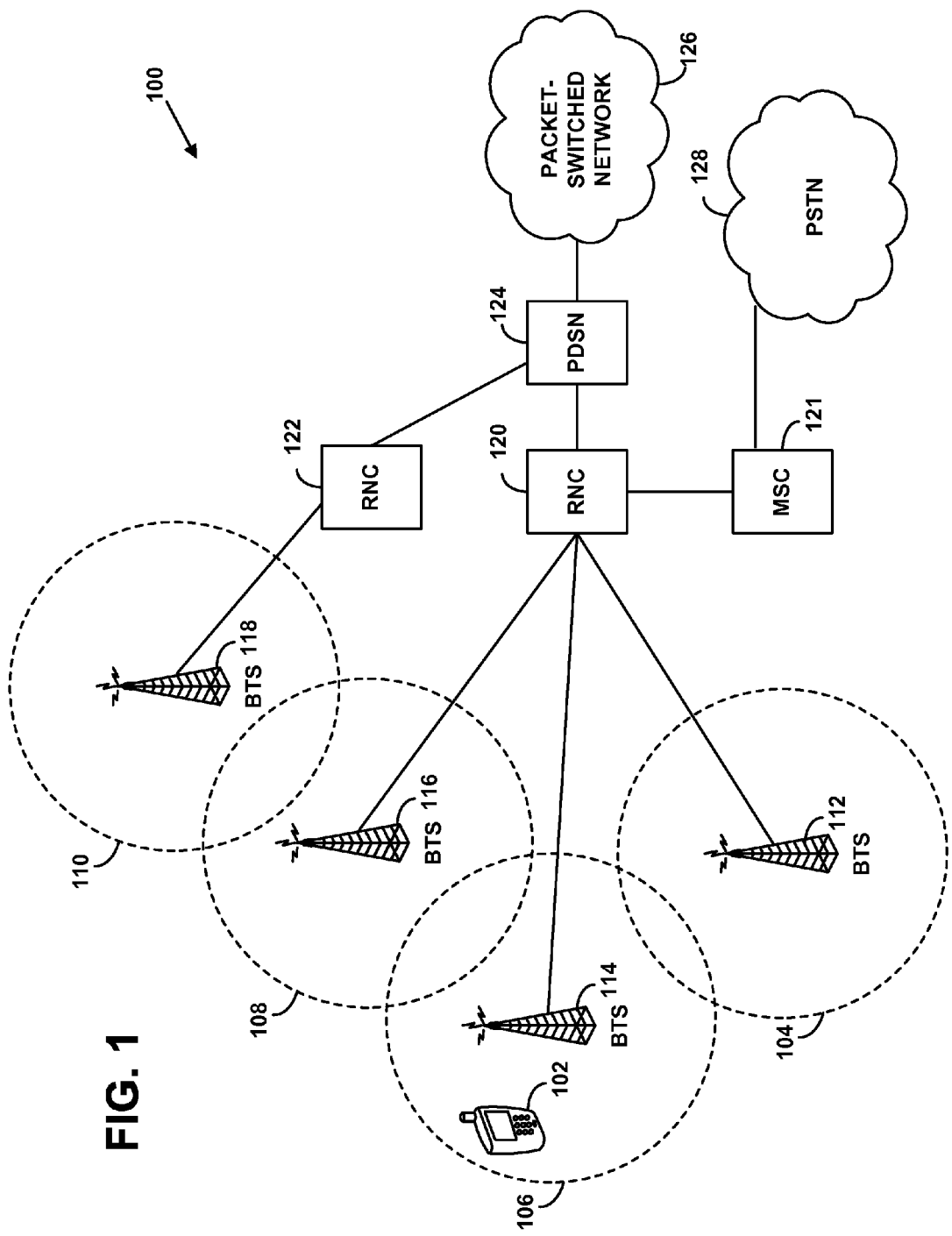
FIG. 1 depicts an exemplary communication system in which exemplary embodiments can be carried out or deployed.

FIG. 1 is a simplified block diagram illustrating a wireless access network 100, which may also be referred to as a radio access network (RAN). In order to provide wireless service, access network 100 may include numerous base transceiver station (BTS) towers, such as BTSs 112-118, which together provide substantially contiguous coverage for wireless subscribers. Each BTS 112-118 can be configured to define a respective cell site, as well as number of cell sectors, such as sectors 104-110. Groups of BTS towers in a given region will then typically be connected with a radio network controller (RNC) (also known as a base station controller (BSC)). In access network 100, BTSs 112-116 are connected to RNC 120, and BTS 118 is connected to RNC 122. An RNC may then connect with a switch, such as mobile switching center (MSC) 121, which provides connectivity with a transport network, such as a public switched telephone network (PSTN) 128, or with a gateway, such as a packet-data serving node (PDSN) 124, which provides connectivity with a packet-switched network 126 such as the Internet.

With this arrangement, when an access terminal 102 (such as a cellular telephone or wirelessly-equipped portable computer or personal digital assistant, for instance) is positioned in a sector, the access terminal 102 may communicate via an RF air interface with a serving BTS. For instance, when access terminal 102 is located in sector 106, the access terminal may connect to BTS 114. Consequently, a communication path can be established between the access terminal 102 and PSTN 128 or packet-switched network 126 via an RF air interface, BTS 114, RNC 120 and MSC 121 or gateway PDSN 124, respectively.

Communications between access terminal 102 and BTS 114 generally proceed according to one or more air interface protocols, such as Code Division Multiple Access (CDMA), Time Division Multiple Access (TDMA), Global System for Mobile Communications (GSM), 1xRTT, 1xEV-DO, iDEN, AMPS, GPRS, UMTS, EDGE, WiMAX (e.g., IEEE 802.16), LTE, microwave, satellite, MMDS, Wi-Fi (e.g., IEEE 802.11), and/or Bluetooth, among others. Air interface communications from the base station to the access terminal may be referred to as "forward link" or "downlink" communications, while those from the access terminal to the base station may be referred to as "reverse link" or "uplink" communications.

To provide the arrangement of FIG. 1 in practice, each access terminal is commonly equipped with a "access terminal modem" chipset such as one of the various "MSM" chipsets available from Qualcomm Incorporated, and each base station is commonly equipped with a "cell site modem" chipset such as one of the various "CSM" chipsets available from Qualcomm Incorporated. Preferably, the air-interface protocols under which service is provided by BTSs 112-118 include EV-DO, and accordingly, chipsets implemented by an access terminal and a base station may have EV-DO operating modes (e.g., 1xEV-DO Rev. 0 or Rev. A), and may be programmatically set to operate in that mode. It should be understood that other chipsets, including upgrades to the chipsets named herein, as well as others providing similar functionality, may also be utilized without departing from the scope of the invention.

Under EV-DO, the forward link uses time-division multiplexing (TDM) in order to allocate all of the sector's forward-link power to a given access terminal at any given moment, while the reverse link retains the code-division multiplexing (CDM) format of 1xRTT, albeit with the addition of a "data rate control" (DRC) channel used to indicate the supportable data rate and best serving sector for the forward link. The EV-DO forward link is divided into time slots of length 2048 chips, and each time slot is further time-division multiplexed to carry various channels, including a pilot channel, Medium Access Control (MAC) channels (i.e., channels included in the MAC layer), a "control" channel, and, if any traffic exists, forward traffic channels.

Forward traffic channels are used for transmission of user data (e.g., the data making up an incoming communication, incoming file, etc.) from a base station to an access terminal. In EV-DO, only one access terminal receives data via a forward traffic channel in each time slot. To accommodate this configuration, a scheduler is used to assign a particular access terminal for each time slot. As such, each packet sent on the traffic channel includes a preamble, which in turn includes a MAC Index (MAC-ID) indicating the access terminal for which the packet is intended. The scheduler may be integrated into an RNC or exist as a separate entity that monitors and schedules user data being sent from one or multiple RNCs.

When a base station (e.g., base transceiver station (BTS)) receives a request to connect from an access terminal, the BTS passes the request on to its associated radio network controller (RNC). The RNC then determines which traffic channel to assign based on such factors as the available traffic channels and the type of service being requested (e.g., voice, data, etc.), among others. The RNC then sends a traffic channel assignment (TCA) message to the BTS (or simply a message including information that can be used by the BTS to generate a TCA message to be sent to the access terminal). In turn, the BTS sends the TCA message to the access terminal, thereby notifying the access terminal of its assigned air-interface traffic channel. In an exemplary embodiment, each TCA message includes a Walsh Code and/or a MAC Index that corresponds to the assigned traffic channel.

Upon receipt of the TCA message, the access terminal tunes to the assigned traffic channel (as indicated by the Walsh code and/or MAC-ID in the TCA message) and receives blank frames transmitted by the base station. The access terminal then confirms receipt of the blank frames by sending a preamble of blank frames to the base station. In turn, the access terminal acknowledges receipt of the blank frames by sending an Acknowledgement Order message to the access terminal. The access terminal then acknowledges with an Acknowledgement Order message to the base station over the traffic channel.

Control channel information in an EV-DO access network is typically sent using packetized data structures referred to as "control channel MAC layer packets," which are typically sent in repeating groups of 256 slots referred to as "control channel cycles." Under EV-DO, control channel information may be transmitted according to a predetermined schedule in synchronous capsules or sub-synchronous capsules (each of these capsules being made up of a number of control channel MAC layer packets). The access network typically transmits exactly one synchronous control channel capsule per sector during each control channel cycle. As such, synchronous capsules in EV-DO are sent periodically, typically at intervals that are multiples of 256 time slots (or ever 426 ms). Control channel information may also be sent on an as-needed basis in "asynchronous capsules," which can be sent at any time except for when a synchronous or sub-synchronous capsule is scheduled.

Under EV-DO, the access network periodically broadcasts an overhead message referred to as a QuickConfig message via the control channel. QuickConfig messages are primarily used to provide access terminals with access-network system information, which can potentially change quite frequently. The access network typically broadcasts a QuickConfig message for each sector, once in each control channel cycle. To do so, the access network includes a QuickConfig message in each synchronous capsule. In particular, the access network includes each QuickConfig message in a "control channel synchronous sleep state capsule," which is a sub-capsule within a synchronous capsule. The control channel synchronous sleep state capsule includes the control channel MAC layer packets in a synchronous capsule, starting from the first control channel MAC layer packet of the synchronous capsule up to and including the first MAC Layer packet in which an overhead bit, which is referred to as the SleepStateCapsuleDone header, is set to '1'.

Each QuickConfig message includes a "ForwardTrafficValid63To0" field that includes a bit for each of the forward traffic channels corresponding to a MAC-ID between MAC-ID_0 and MAC-ID_63. This bit indicates whether the corresponding forward traffic channel is valid. The access network sets a given bit n of the ForwardTrafficValid63To0 field to '1' if the Forward Traffic Channel associated with the MAC-ID 64-n is valid, and sets the given bit to '0' if the Forward Traffic Channel associated with MAC-ID 64-n is invalid. For example, if the Forward Traffic Channel associated with MAC-ID 59 is invalid, the access network sets the fifth bit in the QuickConfig message to be '0'. Herein, the bit in the ForwardTrafficValid63To0 field that corresponds to a given forward traffic channel and MAC-ID may be referred to as the "validity bit" for that forward traffic channel and MAC-ID.

In practice, the ForwardTrafficValid63To0 field only includes validity bits for forward traffic channels that are currently assigned to access terminals. As a result, the size of the ForwardTrafficValid63To0 field may vary according to the number of forward traffic channels that are assigned to access terminals at a given point in time. Accordingly, an RPCcount63to0 field may be used to indicate how many FTCs are accounted for in the ForwardTrafficValid63To0 field. For example, if the RPCcount63to0 field is set equal to ten in a given QuickConfig message, this indicates that the ForwardTrafficValid63To0 field includes ten validity bits, which in turn correspond to ten forward traffic channels. In particular, this indicates that the ForwardTrafficValid63To0 field includes validity bits for MAC-ID 63 to MAC-ID 54, with the first validity bit corresponding to MAC-ID 63 and the last validity bit corresponding to MAC-ID 54.

Furthermore, since some EV-DO access networks are configured to provide up to 128 forward traffic channels, a QuickConfig message may include a RPCCount127To64Included field, which is set to '1' if more than 64 forward traffic channels are provided, and is set to '0' or omitted if no more than 64 forward traffic channels are provided. If the RPCCount127To64Included field is set to '1', then the QuickConfig message includes a "ForwardTrafficValid127To64" field. The ForwardTrafficValid127To64 field includes a bit for each of the forward traffic channels corresponding to a MAC-ID between MAC-ID_64 and MAC-ID_127, which indicates whether the corresponding forward traffic channel is valid. The access network sets a given validity bit n of the ForwardTrafficValid127To64 field to '1' if the Forward Traffic Channel associated with the MACIndex 128-*n* is valid, and sets the given validity bit to '0' if the Forward Traffic Channel associated with MACIndex 128-*n* is invalid.

Like the ForwardTrafficValid63To0 field, the ForwardTrafficValid127To64 field may vary in size according to the number of MAC-IDs between MAC-ID 127 and MAC-ID 64 that are assigned at a given point in time. Accordingly, when the RPCCount127To64Included field is set to '1', a QuickConfig message also includes an RPCcount127to64 field that operates with respect to the ForwardTrafficValid127To64 field, in a similar manner as the RPCcount63to0 field operates in respect to the ForwardTrafficValid63To0 field.

Note that in practice, not all MAC-IDs are available to be used for forward traffic channels, as some MAC-IDs may be used to provide overhead information. As such, less than 128 traffic channels may be provided (or less than 64, depending on the maximum number of MAC-IDs in the given access network). For example, in some existing EV-DO access networks where 128 MAC-IDs are available, only 114 MAC-IDs are used for forward traffic channels, and thus, a maximum of 114 forward traffic channels are available in a given sector.

In an EVDO access network, a BTS typically deems a forward traffic channel to be invalid when the BTS detects that the reverse link signal has been lost from the access terminal to which the forward traffic channel is assigned. More specifically, EVDO access terminals are typically configured to send a DRC message in every slot. Therefore, if an access network goes for a predetermined number of slots without receiving a DRC message from an access terminal, then the access terminal concludes that the reverse link from this access terminal has been lost, and thus deems the corresponding forward traffic channel to be invalid.

Under EVDO, an access terminal monitors the ForwardTrafficValid63To0 field of QuickConfig messages for the validity bit associated with its assigned MAC-ID (i.e., the validity indication for its assigned forward traffic channel). So long as the validity bit for the access terminal's assigned MAC-ID is set to '1', the access terminal continues to operate as it had been. However, if the validity bit for its assigned MAC-ID is set to '0' (or if the ForwardTrafficValid63To0 field does not include any validity indication for its assigned MAC-ID), then an access terminal deems the forward traffic channel to have been lost, and transitions to an inactive state (i.e., drops the call in which it was engaged).

However, when an access terminal loses reverse-link connectivity, it is also very possible that forward-link connectivity will be lost as well. When this occurs, the access terminal will not receive QuickConfig messages indicating that the forward traffic channel is invalid, and thus will not know that its call has been dropped. Instead, when forward-link communications are not received as expected, the access terminal starts a drop-call timer. Then, if the drop-call timer expires, and the access terminal has still not received any communications from the access network, the access terminal concludes that its call has been dropped and transitions to an inactive state.

Figure 2:
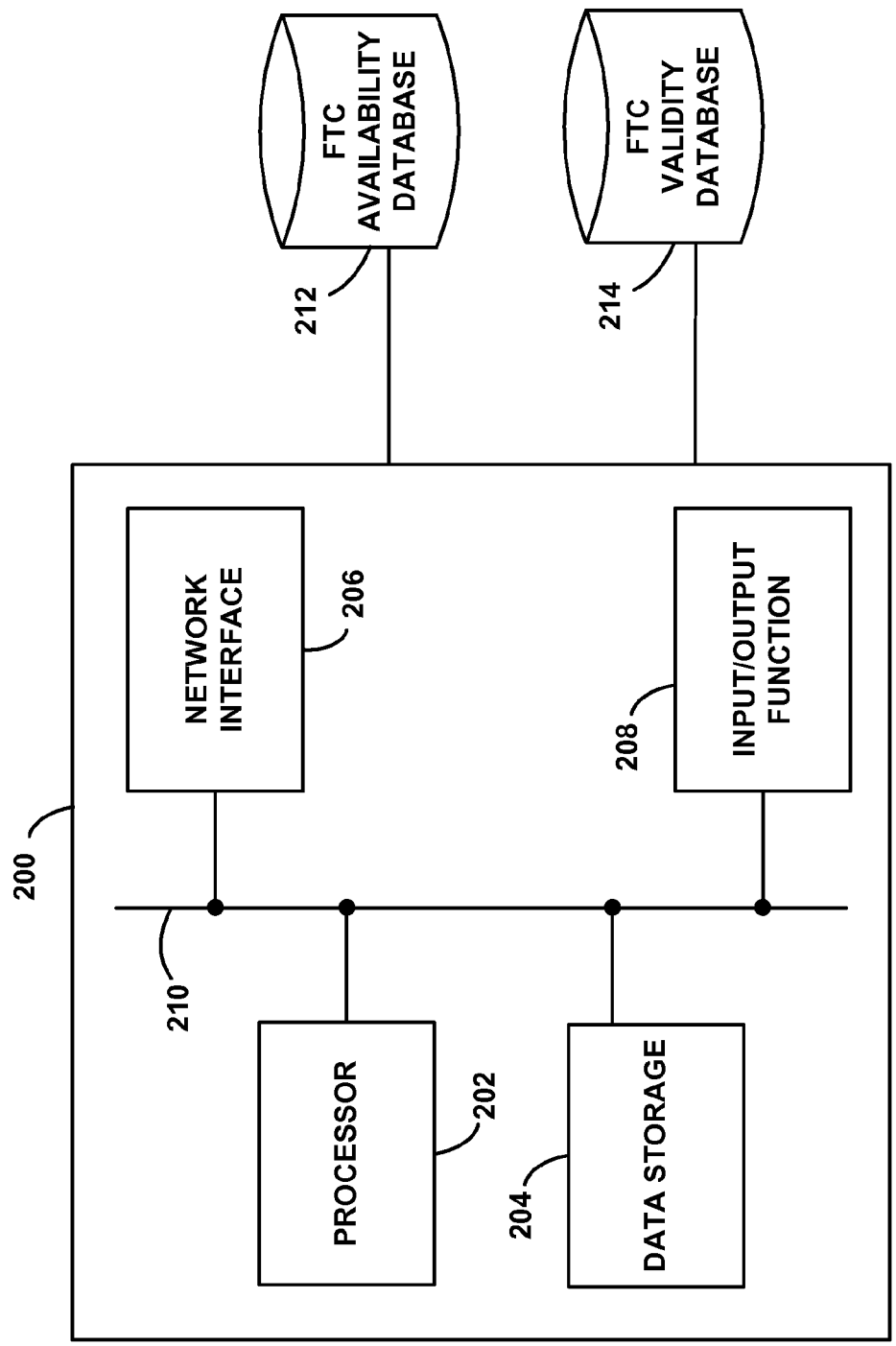
FIG. 2 is a simplified block diagram exemplifying an access-network component, according to an exemplary embodiment.

FIG. 2 is a simplified block diagram illustrating an exemplary access-network component 200, and illustrating some of the functional components that would likely be found in an access-network component arranged to operate in accordance with the embodiments herein. The exemplary access-network component 200 could be any type of device found in or associated with an access network. In a preferred embodiment, the access-network component is a BTS. However, the access-network component may take the form of another access network component such as a BSC or an MSC. Further, an exemplary access-network component may in fact include multiple components of the access network that combine to provide the functionality described herein, without departing from the scope of the invention.

Access-network component 200 preferably includes at least one processor 202, a data storage 204 (i.e., a non-transitory tangible computer-readable medium), a network interface 206, and an input/output function 208, all of which may be coupled together by a system bus 210 or a similar mechanism. Processor 202 preferably includes one or more CPUs, such as one or more general purpose processors and/or one or more dedicated processors (e.g., application specific integrated circuits (ASICs) or digital signal processors (DSPs), etc.)

Data storage 204, in turn, may comprise volatile and/or non-volatile memory and can be integrated in whole or in part with processor 202. Data storage 204 preferably holds program instructions, executable by processor 202, and data that is manipulated by these instructions to carry out the various methods, processes, or functions described herein. Alternatively, these methods, processes, or functions can be defined by hardware, firmware, and/or any combination of hardware, firmware and software. By way of example, the data in data storage 204 may contain program instructions executable by processor 202 to carry out any of the methods, processes, or functions disclosed in this specification or the accompanying drawings.

Network interface 206 may take the form of a wireline connection, such as an Ethernet, Token Ring, or T-carrier connection. Network interface 206 may also take the form of a wireless connection, such as IEEE 802.11 (Wifi), BLUETOOTH®, or a wide-area wireless connection. However, other forms of physical layer connections and other types of standard or proprietary communication protocols may be used over network interface 206. Furthermore, network interface 206 may comprise multiple physical interfaces.

Input/output function 208 may facilitate user interaction with the access-network component 200. Input/output function 208 may comprise multiple types of input devices, such as a keyboard, a mouse, a touch screen, and so on. Similarly, input/output function 208 may comprise multiple types of output devices, such as a monitor, printer, or one or more light emitting diodes (LEDs). Additionally or alternatively, access-network component 200 may support remote access from another device, via network interface 206 or via another interface (not shown), such an RS-232 or USB port.

In an exemplary embodiment, whenever access-network component 200 determines that a forward traffic channel that was previously valid has become invalid, it may set the corresponding bit in the ForwardTrafficValid63To0 field of the next QuickConfig message equal to '0'. Further, after sending an initial QuickConfig message indicating that the forward traffic channel is invalide, the access network typically lists the forward traffic channel as invalid (e.g. sets the validity-bit for the corresponding MAC-ID to '0') in all QuickConfig messages sent during a predetermined wait period (e.g., 5 seconds). Therefore, even if the access network determines that the forward traffic channel is again valid during the predetermined time period, it waits for the predetermined time period before setting the validity-bit for the traffic channel to '1'. By indicating that the forward traffic channel is invalid during the wait period, the access network may prevent a scenario where the access network re-assigns the MAC-ID to another access terminal, and the access terminal that had been assigned that MAC-ID wrongly assumes, based on a QuickConfig message, that the forward link communications on that forward traffic channel are intended for it.

Preferably, however, access-network component 200 is also configured to make the forward traffic channel available for re-assignment without waiting until it can set the validity-bit for the traffic channel to '1' (i.e., before the end of the wait period). For example, access-network component 200 may be configured to make the forward traffic channel available for re-assignment immediately after it determines that the forward traffic channel is invalid.

The access-network component 200 may therefore re-assign the forward traffic channel, before it indicates that the forward traffic channel is again valid (and may in fact indicate in one or more QuickConfig messages that the forward traffic channel is invalid, even after re-assigning the forward traffic channel). Doing so may help the access network to more quickly re-assign forward traffic channels, while at the same time avoiding the scenario where an access terminal that was previously assigned the now re-assigned channel, wrongly assumes that communications on the channel are intended for it. Further, to facilitate this process, an AT may be configured to ignore QuickConfig messages for the predetermined period of time. As such, it will not receive any QuickConfig messages indicating its assigned traffic channel is invalid.

To facilitate the functionality described herein, an exemplary access-network component 200 may include or have access to a forward-traffic-channel availability database 212, which stores data indicating which forward traffic channels are available in each of one or more sectors of the access network. For instance, forward-traffic-channel availability database 212 may include data associating an availability indicator with the MAC-ID for each forward traffic channel in a given sector.

Furthermore, an exemplary access-network component 200 may include or have access to a forward-traffic-channel validity database 214, in which data indicating the validity of forward traffic channels that are currently assigned to access terminals in a given sector. For instance, forward-traffic-channel validity database 214 may include data associating a validity indicator with the MAC-ID for each forward traffic channel that is currently assigned to an access terminal. Note that when a forward traffic channel has been reassigned, the access-network component 200 still must list the forward traffic channel as invalid for the duration of the wait period. Accordingly, forward-traffic-channel validity database 214 may further indicate, at a given point in time, which recently re-assigned forward traffic channels are in the midst of the predetermined wait period. As such, the access-network component 200 understands that it should send QuickConfig messages that indicate these forward traffic channels are invalid, but should treat each of these forward traffic channel as a valid traffic channel with respect to the access terminal that the forward traffic channel has been re-assigned to.

While forward-traffic-channel availability database 212 and forward-traffic-channel validity database 214 are shown as separate entities, it should be understood that the data in these databases may be combined in a common data storage entity. Furthermore, while forward-traffic-channel availability database 212 and forward-traffic-channel validity database 214 are shown as separate entities from access-network component 200, it should be understood that one or both of these databases may be maintained in local data storage of access-network component 200. Other variations on the illustrated embodiment of access-network component 200 are also possible.

Figure 3:
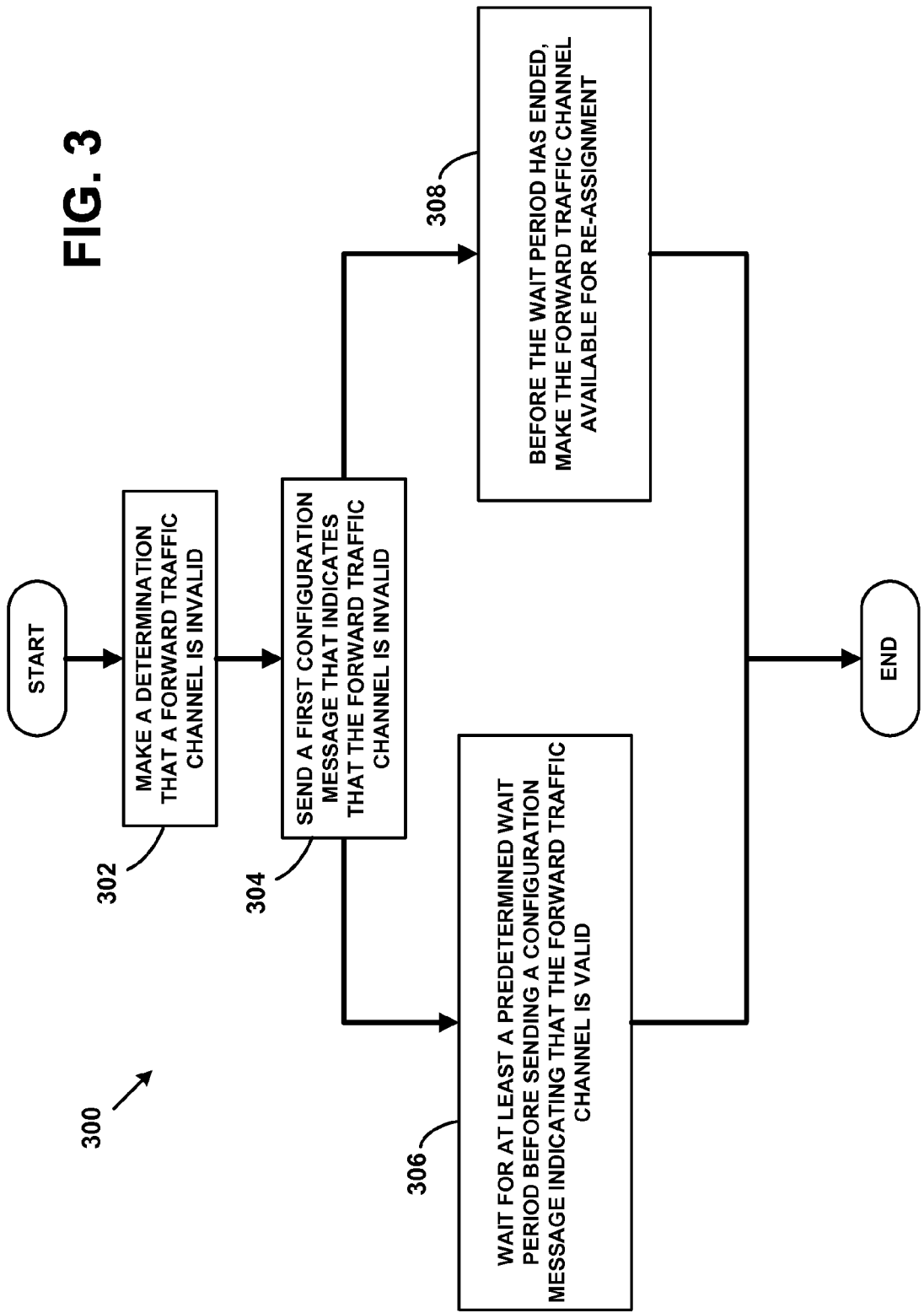
FIG. 3 is a flow chart illustrating a method according to an exemplary embodiment.

FIG. 3 is a flow chart illustrating a method 300, according to an exemplary embodiment. The method 300 may be implemented by an access network in order to help more quickly re-assign forward traffic channels that have become invalid. In particular, the method 300 involves an access network making a determination that a forward traffic channel is invalid, as shown by block 302. Then, in response to the determination that the forward traffic channel is invalid, the access network sends a first configuration message that indicates that the forward traffic channel is invalid, as shown by block 304. After sending the first configuration message, the access network waits for at least a predetermined wait period and before sending a configuration message (e.g., a QuickConfig message) indicating that the forward traffic channel is valid, as shown by block 306. Furthermore, before the wait period has ended, the access network makes the forward traffic channel available for re-assignment, as shown by block 308.

In an exemplary embodiment, the method is carried out by a BTS that is configured to periodically send QuickConfig messages (e.g., once every control-channel cycle). Accordingly, once the BTS detects that the reverse-link connection with a given access terminal has been lost or interrupted, and thus determines that the corresponding forward traffic channel assigned to that access terminal is invalid, the BTS begins including an indication that the forward traffic channel is invalid in subsequent QuickConfig messages. The BTS continues to broadcast QuickConfig messages indicating that the forward traffic channel is invalid for at least the predetermined wait period.

The duration of the wait period during which BTS indicates that the forward traffic channel is invalid may be selected as a matter of engineering design choice. For example, access terminals generally implement a drop call timer to determine when a call has been dropped. As such, if an access terminal does not receive a QuickConfig message with the validity bit for its assigned forward traffic channel set to '0', which is very possible when the forward traffic channel is invalid, the access terminal may start its drop call timer. Accordingly, the duration of the wait period may be greater than or equal to the duration of the drop-call timer, thus allowing the access terminal's drop call timer to expire before an indication that the forward traffic channel is valid is sent. As such, the access terminal understands that its call has been dropped, and in the event that the forward traffic channel has already been re-assigned, the access terminal does not erroneously conclude that the forward traffic channel is valid and still assigned to it.

However, in carrying out method 300, an exemplary BTS does not wait for the predetermined wait period to end before making the forward traffic channel available for re-assignment. Rather, before the wait period of time has ended, the BTS may, for example, add the forward traffic channel to a list of available forward traffic channels. When a new request to connect is received from an access terminal, the BTS may select a forward traffic channel for the access terminal from this list. Accordingly, a forward traffic channel that has become invalid can be re-assigned as soon as it is added to the list of available forward traffic channels. Preferably, the BTS adds a forward traffic channel the list of available forward traffic channels immediately upon determining that the forward traffic channel is invalid. However, it is also possible that the BTS may wait for some period of time to add the forward traffic channel to the list, so long as it is added before the predetermined period of time during which BTS indicates that the forward traffic channel is invalid has elapsed.

In a further aspect, an exemplary method may be implemented in response to a determination that traffic-channel usage is above a threshold usage level. For example, a BTS may by default be configured to delay re-assigning forward traffic channels until after the predetermined wait period. However, the BTS may monitor traffic-channel usage, and detect when more than a predetermined number or predetermined percentage of MAC-IDs are currently assigned (or conversely, that less than a predetermined number or predetermined percentage are still available to be assigned). When this scenario is detected, the BTS may switch to an operating mode in which it re-assigns forward traffic channels more quickly, using a method such as method 300.

Figure 4:
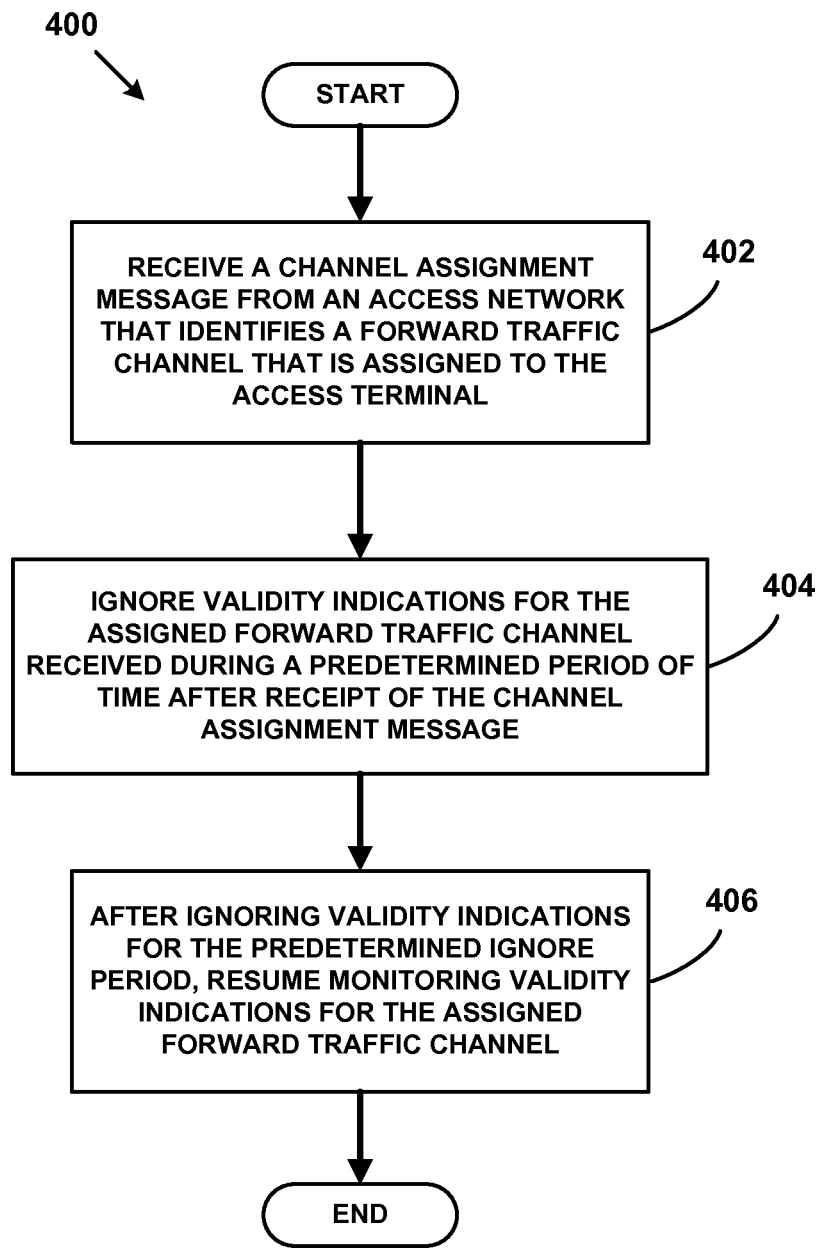
FIG. 4 is another flow chart illustrating a method according to an exemplary embodiment.

FIG. 4 is another flow chart illustrating a method 400, according to an exemplary embodiment. The method 400 may be implemented by an access terminal operating in access network that implements an exemplary method (e.g., method 300) in order to help more quickly re-assign forward traffic channels that have become invalid. In particular, an exemplary access network may continue to indicate that a forward traffic channel is invalid for a period of time after the forward traffic channel has been re-assigned from a first access terminal to a second terminal, in order that the first access terminal will understand that it is no longer assigned the forward traffic channel. However, the re-assigned forward traffic channel may be valid for the second access terminal (which has presumably established forward and reverse-link connections with the access network). Accordingly, by implementing method 400, the second access terminal may avoid misinterpreting a QuickConfig message as indicating that its recently-assigned forward traffic channel is invalid.

As shown, method 400 involves an access terminal receiving a channel assignment message from an access network, which identifies a forward traffic channel that is assigned to the access terminal, as shown by block 402. The access terminal then ignores validity indications for the assigned forward traffic channel in any configuration messages (e.g., validity bits in any QuickConfig messages) received during a predetermined ignore period after receipt of the channel assignment message (e.g., a TCA message), as shown by block 404. The ignore period during which the access terminal ignores validity indications is preferably equal to or longer than the access network's predetermined wait period after sending a QuickConfig message that indicates a forward traffic channel is invalid. After ignoring validity indications for the predetermined ignore period, the access terminal resumes monitoring validity indications for the assigned forward traffic channel in configuration messages received from the access network, as shown by block 406.

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

I claim:

1. A method comprising:
    an access network making a determination that a forward traffic channel is invalid, wherein the forward traffic channel is initially assigned to a first access terminal; and
    in response to the determination that the forward traffic channel is invalid, the access network:
        (a) sending a first configuration message indicating that the forward traffic channel is invalid;
        (b) after sending the first configuration message that indicates the forward traffic channel is invalid, waiting for at least a predetermined wait period before sending a second configuration message indicating that the forward traffic channel is valid, wherein the predetermined wait period comprises a duration of a drop-call timer of the first access terminal; and
        (c) before the predetermined wait period has ended, making the forward traffic channel available for re-assignment to a second access terminal.

2. The method of claim 1, wherein the first configuration message is a QuickConfig message.

3. The method of claim 1, further comprising, while waiting for the predetermined period of time to elapse, the access network sending one or more QuickConfig messages that each indicate that the forward traffic channel is invalid.

4. The method of claim 3, wherein each QuickConfig message that indicates that the forward traffic channel is invalid includes a validity bit associated with the forward traffic channel, wherein the validity bit is set to indicate that the forward traffic channel is invalid.

5. The method of claim 3, wherein each QuickConfig message that indicates that the forward traffic channel is invalid comprises a list of valid forward traffic channels, and wherein an absence of the forward traffic channel in the list indicates that the forward traffic channel is invalid.

6. The method of claim 1, wherein making the forward traffic channel available for re-assignment to a second access terminal comprises, after determining that the forward traffic channel is invalid, immediately adding the forward traffic channel to a list of available forward traffic channels that are available to be assigned to the second access terminal.

7. The method of claim 6, further comprising, after adding the forward traffic channel to the list of available forward traffic channels and during the predetermined period of time, sending one or more QuickConfig messages indicating that the forward traffic channel is invalid.

8. The method of claim 1, further comprising, before the predetermined period of time has elapsed, re-assigning the forward traffic channel to a second access terminal.

9. The method of claim 8, further comprising, during the predetermined period of time, including after the forward traffic channel is re-assigned to the second access terminal, periodically sending QuickConfig messages indicating that the forward traffic channel is invalid.

10. The method of claim 1, wherein waiting for at least the predetermined period of time to elapse before sending a QuickConfig message indicating that the forward traffic channel is valid comprises:
    starting a forward-traffic-channel validity timer having a predetermined duration; and
    after the duration of the forward-traffic-channel validity timer;

if the forward traffic channel is valid, then sending a QuickConfig message indicating that the forward traffic channel is valid; and if the forward traffic channel is invalid, then sending a QuickConfig message indicating that the forward traffic channel is invalid.

11. The method of claim 1, further comprising performing the method in response to a determination that traffic-channel usage is above a threshold usage level.

12. A method comprising:

an access terminal receiving a channel assignment message from an access network, wherein the channel assignment message identifies a forward traffic channel that is assigned to the access terminal; and responsive to receipt of the channel assignment message, the access terminal ignoring validity indications for the assigned forward traffic channel in any QuickConfig messages received during a predetermined ignore period.

13. The method of claim 12, wherein the channel assignment message identifies the forward traffic channel that is assigned to the access terminal with a medium access control identifier (MAC-ID) that is associated with the forward traffic channel and assigned to the access terminal.

14. The method of claim 12, further comprising, after the predetermined ignore period has ended, the access terminal monitoring validity indications for the assigned forward traffic channel in QuickConfig messages received from the access network.

15. An access-network component comprising:

a non-transitory tangible computer-readable medium;

program instructions stored on the non-transitory tangible computer-readable medium and executable by at least one processor to:

(i) determine that a forward traffic channel in a given coverage area of an access network is invalid, wherein the forward traffic channel is initially assigned to a first access terminal; and (ii) in response to the determination that the forward traffic channel is invalid: (a) send a first configuration message indicating that the forward traffic channel is invalid, (b) after sending the first configuration message that indicates the forward traffic channel is invalid, wait for at least a predetermined wait period before sending a second configuration message indicating that the forward traffic channel is valid, wherein the predetermined wait period comprises a duration of a drop-call timer of the first access terminal, and (c) before the predetermined wait period has ended, make the forward traffic channel available for re-assignment to a second access terminal.

16. The access-network component of claim 15, wherein the first configuration message is a QuickConfig message.

17. The access-network component of claim 15, further comprising program instructions stored on the non-transitory tangible computer-readable medium and executable by at least one processor to, during the wait period, send one or more QuickConfig messages that each indicate that the forward traffic channel is invalid.

18. The access-network component of claim 15, further comprising program instructions stored on the non-transitory tangible computer-readable medium and executable by at least one processor to, before the wait period has ended, re-assign the forward traffic channel to a second access terminal.

19. The access-network component of claim 15, wherein the program instructions stored on the non-transitory tangible computer-readable medium and executable by at least one processor to make the forward traffic channel available for re-assignment comprise:

program instructions stored on the non-transitory tangible computer-readable medium and executable by at least one processor to, upon a determination that the forward traffic channel is invalid, update an entry in a forward-traffic-channel availability database to indicate that the forward traffic channel is available to be assigned to access terminals.

20. The access-network component of claim 15, further comprising program instructions stored on the non-transitory tangible computer-readable medium and executable by at least one processor to:

in response to the determination that the forward traffic channel is invalid, start a wait timer having a duration equal to the predetermined wait period;

while the wait timer is running, send one or more QuickConfig messages, wherein each QuickConfig message comprises an indication that the forward traffic channel is invalid;

when the wait timer expires, determine if the forward traffic channel is re-assigned to another access terminal; and if the forward traffic channel is re-assigned to another access terminal, then send a QuickConfig message comprising an indication that the forward traffic channel is valid.

21. The access-network component of claim 15, further comprising program instructions stored on the non-transitory tangible computer-readable medium and executable by at least one processor to:

make a determination that traffic-channel usage is above a threshold usage level; and perform (i)-(ii) in response to the determination that traffic-channel usage is above the threshold usage level.

* * * * *